United States Patent [19]

Yosida et al.

[11] Patent Number: 4,959,835

[45] Date of Patent: Sep. 25, 1990

[54] SEMICONDUCTOR MEMORY

[75] Inventors: Nobuo Yosida; Teruhisa Shimizu, both of Ohme, Japan

[73] Assignee: Hitachi, Ltd., Tokyo, Japan

[21] Appl. No.: 293,444

[22] Filed: Jan. 4, 1989

[30] Foreign Application Priority Data

Jan. 12, 1988 [JP] Japan .................................... 63-4417

[51] Int. Cl.[5] .............................................. G06F 11/00

[52] U.S. Cl. .................................... 371/51.1; 371/21.1

[58] Field of Search .................... 371/21.1, 21.2, 21.3, 371/21.5, 49.1, 51.1, 40.1; 365/200, 201

[56] References Cited

U.S. PATENT DOCUMENTS 4,768,193 8/1988 Takemae ............................ 371/51.1
4,785,452 11/1988 Petz .................................... 371/51.1
4,809,278 2/1989 Kim .................................... 371/51.1
4,811,347 3/1989 Bolt .................................... 371/51.1

OTHER PUBLICATIONS

Nikkei Electronics, Nikkei McGraw-Hill, pp. 137-152, Dec. 5, 1983.

*Primary Examiner*—Michael R. Fleming
*Attorney, Agent, or Firm*—Antonelli, Terry, Stout & Kraus

[57] ABSTRACT

A memory management unit is capable of judging that a specific bit has been partially rewritten by checking it against a dummy bit stored in a tag memory which is included in the memory management unit and thus correcting a parity bit. Accordingly, it is possible to accurately execute a parity check operation and it is also possible to improve the throughput of the memory management unit and hence promote lowering in the cost.

10 Claims, 3 Drawing Sheets

SEMICONDUCTOR MEMORY

BACKGROUND OF THE INVENTION

The present invention relates to a semiconductor memory and, more particularly, to a technical which may be effectively applied to an address transformation buffer or the like which is included in a memory management unit of a digital processing system adopting the virtual storage method.

The virtual storage method is one means for removing constraints imposed by the physical properties of memories and thus producing a flexible program system. A digital processing system that employs the virtual storage method is provided with a memory management unit 1 for transforming a logical address output from a processing unit into a physical address on a main memory within a bus cycle thereof.

The memory management unit 1 includes an address transformation buffer 5 and an address transformation control circuit 6. The address transformation buffer 5 is arranged to have a necessary and minimum number of entries with which the hit rate is in excess of a predetermined value, and it is controlled by the address transformation control circuit 6. The address transformation control circuit 6 also functions as a so-called DAT controller which executes a paging processing autonomously without the aid of a control program (operating system) when the address transformation buffer 5 mishits.

The memory management unit is described, for example, in "Nikkei Electronics", Dec. 5, 1983, Nikkei McGraw-Hill, pp. 137–152.

The studies conducted by the present inventors has, however, revealed that the prior art suffers from the following disadvantages.

In the memory management unit 1 of the type described above, the address transformation buffer 5 includes a tag memory 11 for storing, for example, tags which are allotted to the corresponding entries, that is, index portions ID of logical addresses, and a frame number memory 12 for storing the frame numbers FN of the physical addresses corresponding to the tags. The tag memory 11 is stored with address validity flags F each of which represents whether or not the corresponding entry is valid. Further, the tag memory 11 and the frame number memory 12 are respectively provided with parity bits used to judge whether or not readout data is normal.

In the tag memory 11 and the frame number memory 12, the index portions ID and the frame numbers FN are respectively input and output in units of address. The address validity flags F in the tag memory 11 are also usually input and output in units of address together with the index portions ID, but there are cases where the address validity flags F are partially rewritten independently of the index portions ID and the parity bits because of the necessities to reset all the addresses simultaneously at the time, for example, of switching over programs from one to another in the digital processing system and to achieve high efficiency of the address management. Accordingly, it is necessary, in order to hold the validity of the parity bits, to read out the contents of the relevant addresses from the tag memory 11 and rewrite the parity bits correctly every time the above-described reset operation or partial rewriting operation is conducted, which complicates the processing conducted in the memory management unit 1, resulting in a lowering in the throughput thereof, and which also complicates the circuit configuration of the memory management unit 1 and thus constitutes one of the causes of prevention of lowering in the cost thereof.

SUMMARY OF THE INVENTION

It is an object of the present invention to provide a semiconductor memory such as an address transformation buffer or the like which has a specific bit and which further has a parity bit correcting function.

It is another object of the present invention to promote simplification of a memory management unit or the like which includes an address transformation buffer and lowering in the cost thereof.

The above and other objects and novel features of the present invention will be clear from the following description of the preferred embodiments thereof taken in conjunction with the accompanying drawings.

The following is a brief summary of a typical one of the novel techniques disclosed in the present application.

Namely, a semiconductor memory such as an address transformation buffer that has a specific bit which may be partially rewritten in a reset operation or the like is provided with a dummy bit which is allowed to have the same content as that of the specific bit in a write operation executed in units of address and whose content is not rewritten in the reset operation or the like. The semiconductor memory is further provided with a parity transfer circuit which is arranged such that, when the content of the dummy bit is coincident with that of the specific bit in a read operation executed in units of address, the parity transfer circuit transmits a parity bit to a parity check circuit as it is, whereas, when those contents are not coincident with each other, the parity transfer circuit inverts the parity bit and transmits the inverted parity bit to the parity check circuit.

By virtue of the above-described means, it is possible to judge that the specific bit has been partially rewritten by checking the specific bit against the dummy bit and to thereby effect correction of the parity bit. Accordingly, it is possible to accurately execute the parity check operation and it is also possible to improve the throughput of the memory management unit and hence promote lowering in the cost thereof.

DESCRIPTION OF THE PREFERRED EMBODIMENTS

Figure 1:
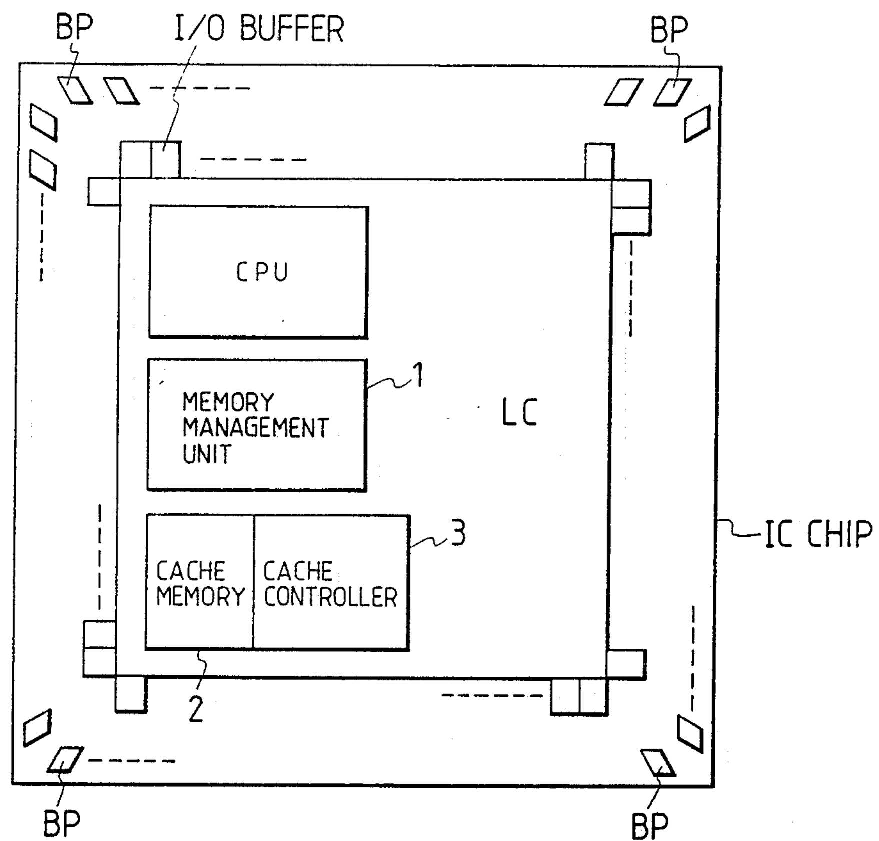
FIG. 1 is a plan view showing one example of a semiconductor substrate on which is formed a memory management unit adopting the virtual storage method to which the present invention is applied.

FIG. 1 is a plan view showing one example of a semiconductor substrate (IC chip) on which is formed a memory management unit adopting the virtual storage method to which the present invention is applied. A memory management unit 1 in this embodiment is, although not necessarily limitative, incorporated in a one-chip digital processing system such as a microcomputer. Circuit blocks that constitute in combination the digital processing system are, although not necessarily limitative, formed on a single semiconductor substrate made of single crystal silicon by known CMOS (Complementary MOS) integrated circuit manufacturing techniques.

Referring to FIG. 1, a plurality of bonding pads BP are provided in the peripheral region of the semiconductor substrate. These bonding pads BP are coupled to the corresponding external terminals through bonding wires or the like. Some of the bonding pads BP are coupled to the corresponding unit circuits in an input/output circuit I/O which is formed at each end portion of the semiconductor substrate.

The input/output circuits I/O take in various kinds of input digital signals which are supplied from external units and transmit the input digital signals to the corresponding internal circuits in the digital processing system. The input/output circuits I/O further deliver to the external units various kinds of output digital signals which are output from the corresponding internal circuits in the digital processing system.

In the greater part of the semiconductor substrate is formed a central processing unit CPU, memory management unit 1, cache memory 2, cache controller 3 for controlling the cache memory 2 and a logic circuit section LC including various control units, which constitute in combination the digital processing system. The memory management unit 1 in this embodiment is formed at a predetermined position which is surrounded by the logic circuit section LC. The memory management unit 1 is, although not necessarily limitative, employed as an address signal transformation unit of the digital processing system.

Figure 2:
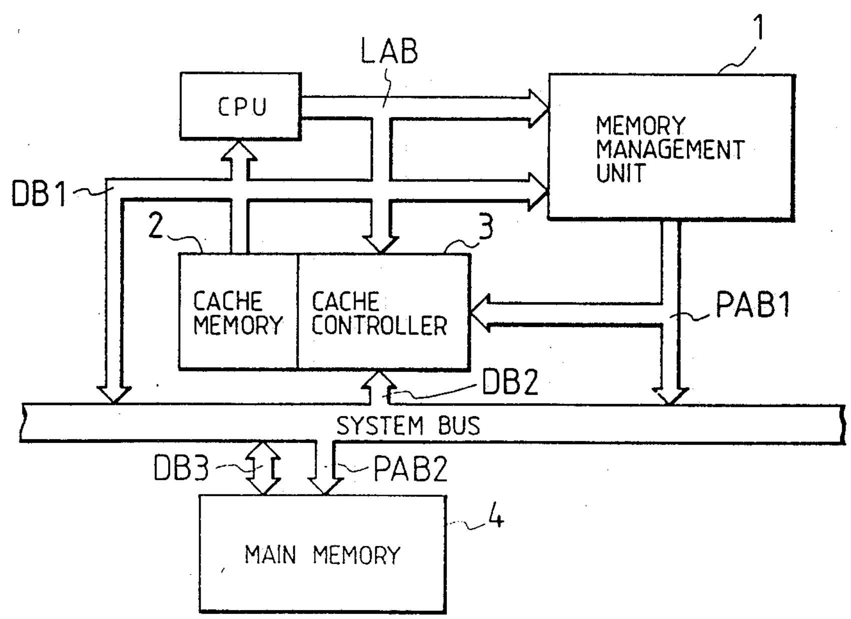
FIG. 2 is a block diagram of a memory system to which the present invention is applied.

FIG. 2 is a block diagram of a memory system to which the present invention is applied.

Referring to FIG. 2, the central processing unit CPU is coupled to the memory management unit 1 and the cache controller 3 through a logical address bus LAB. The central processing unit CPU is also coupled to the memory management unit 1, the cache memory 2 and a system bus through a data bus DB1. Further, the memory management unit 1 is coupled to the cache controller 3 and the system bus through a physical address bus PAB1. A main memory 4 is coupled to the system bus through a data bus DB3. The system bus is needed when data or the like is exchanged with the main memory 4 formed on a chip which is different from that on which, for example, the central processing unit CPU in this figure is formed. The system bus is, although not necessarily limitative, comprised of a data bus DB2, a physical address bus PAB2 and a control bus (not shown). In other words, the physical address bus PAB1 is coupled to the physical address bus PAB1 and the main memory 4, while the data bus DB2 is coupled to the data bus DB1 and the cache controller 3. The logical address bus is a bus for transferring logical addresses from the central processing unit CPU, while the physical address bus is a bus for transferring physical addresses from the memory management unit 1.

The cache memory 2 is stored with those of data in the main memory 4 which are used most frequently or the data which was last used. The memory management unit 1 is stored with addresses corresponding to the data stored in the cache memory 2. Accordingly, when a logical address which is supplied from the central processing unit CPU hits, the memory management unit 1 accesses the cache memory 2, whereas, when the supplied logical address mishits, the memory management unit 1 accesses the main memory 4. The term "hit" means that a logical address which is supplied from the central processing unit CPU does not require the memory management unit 1 to access the main memory 4 but only needs the cache memory 2 to be accessed. The term "mishit" means that a logical address supplied from the central processing unit CPU requires the memory management unit 1 to access the main memory 4.

When the central processing unit CPU executes memory access, if necessary data is stored in the cache memory 2, there is no need of access to the main memory 4, which would otherwise take a great deal of time, and therefore the system performance is improved.

Figure 3:
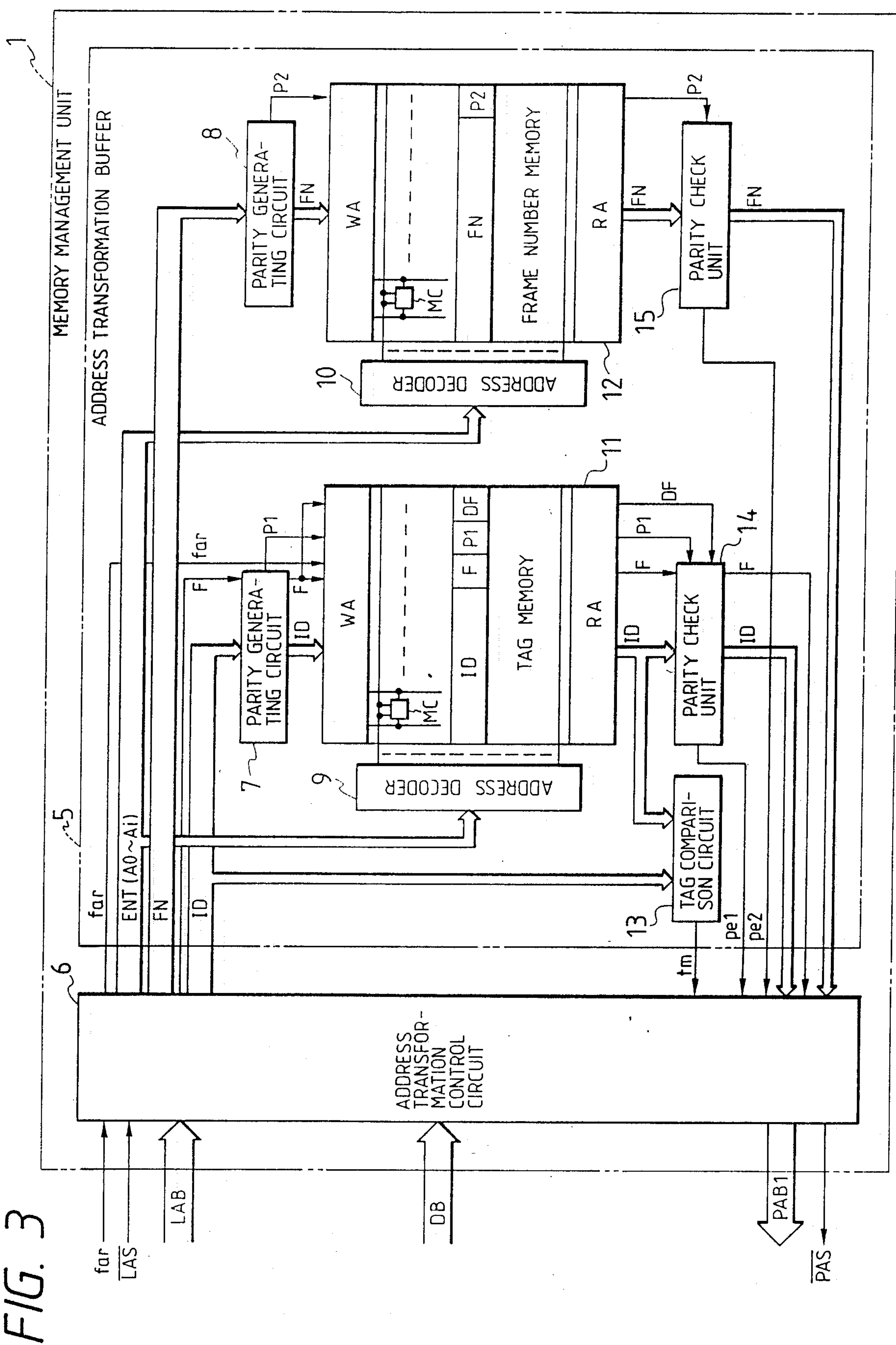
FIG. 3 is a block diagram showing one example of a memory management unit including an address transformation buffer to which the present invention is applied.

FIG. 3 is a block diagram showing one example of the memory management unit 1 including an address transformation buffer 5 to which the present invention is applied.

The memory management unit 1 in this embodiment is, although not necessarily limitative, arranged to transform a logical address supplied from the central processing unit CPU through the logical address bus LAB into a physical address. The physical address is transferred to the main memory 4 and the cache controller 3 through the physical address bus PAB1. The memory management unit 1 includes an address transformation buffer 5 and an address transformation control circuit 6, although not necessarily limitative thereto. The address transformation buffer 5 includes a tag memory 11 and a frame number memory 12, as described later.

The address transformation buffer 5 transforms a logical address supplied thereto from the central processing unit CPU through the logical address bus LAB into an index portion ID, an address validity flag F, an entry portion ENT and a frame number FN.

The tag memory 11 and the frame number memory 12 respectively have the same number of addresses which are arranged to correspond to each other. These addresses are alternatively selected by means of address decoders 9 and 10 which are provided in correspondence with the tag memory 11 and the frame number memory 12, respectively.

In FIG. 3, the address transformation control circuit 6 of the memory management unit 1 is, although not necessarily limitative, coupled to the central processing unit CPU through the data bus DB, the logical address bus LAB, a logical address strobe signal $\overline{LAS}$ and an internal control signal far. The address transformation control circuit 6 is also coupled to the main memory 4 and the cache controller 3 through the data bus DB, the physical address bus PAB1 and a physical address strobe signal $\overline{PAS}$. The logical address strobe signal $\overline{LAS}$ and the physical address strobe signal $\overline{PAS}$ are, although not necessarily limitative, set at a high level in a normal state and selectively brought to a low level when validated.

The address transformation control circuit 6 is, although not necessarily limitative, started when the logical address strobe signal $\overline{LAS}$ is brought to the low level to transform a logical address supplied thereto from the central processing unit CPU through the logical address bus LAB into an index portion ID, an address validity flag F, an entry portion ENT and a frame number FN. The index portion ID is supplied as being a tag for comparative check to a tag comparison circuit 13 in the address transformation buffer 5. Further, the address transformation control circuit 6 supplies the entry portion ENT (i.e., an address signal A0 to Ai comprising i+1 bits) to the address decoders 9 and 10. In consequence, the address transformation buffer 5 is brought into the tag comparison mode to start an operation of checking the index portion ID.

More specifically, the address transformation buffer 5 reads out an index portion ID and a frame number FN from those addresses in the tag memory 11 and the frame number memory 12, respectively, which are designated by the address signal A0 to Ai. The readout index portion ID is supplied to the other input terminal of the tag comparison circuit 13, while the readout frame number FN is, although not necessarily limitative, supplied to the address transformation control circuit 6 as it is. The tag comparison circuit 13 in the address transformation buffer 5 makes a bitwise comparison between the index portion ID read out from the random access memory RAM and the index portion ID which is supplied as being a tag from the address transformation control circuit 6. When, as a result, all the bits of the two index portions ID are coincident with each other, the tag comparison circuit 13 outputs a high-level tag coincidence signal tm to the address transformation control circuit 6. In consequence, the address transformation control circuit 6 takes in the frame number FN which is read out from the frame number memory 12 in correspondence with the index portion ID and delivers it to the physical address bus PAB1 as being a remaining portion of the physical address. Then, the address transformation control circuit 6 brings the physical address strobe signal $\overline{PAS}$ to the low level. As a result, the address transformation control circuit 6 supplies the physical address to the cache controller 3 through the physical address bus PAB1 to access the cache memory 2.

When the address transformation buffer 5 mishits, that is, when there is no index portion ID stored which is coincident with the tag given to that address in the tag memory 12 which is designated by the entry portion ENT, the address transformation control circuit 6 starts a predetermined paging processing. More specifically, the address transformation control circuit 6, when receiving a low-level tag coincidence signal tm, accesses an address transformation table which is provided in the main memory 4 to read out a frame number FN corresponding to the mishit entry portion ENT and index portion ID. Further, the address transformation control circuit 6 reads out an address validity flag F from that address in the tag memory 11 which is designated by the entry portion ENT to confirm that the relevant address is vacant. Next, the address transformation control circuit 6 sets the address transformation buffer 5 in the write mode to write both the mishit index portion ID and the frame number FN read out from the address transformation table in the main memory 4 at those addresses in the tag memory 11 and the frame number memory 12, respectively, which are designated by the entry portion ENT.

The address transformation control circuit 6 further has a flag reset mode function with which it raises the internal control signal far to a high level in response to the instruction given by the central processing unit CPU to thereby reset simultaneously the address validity flags F in the tag memory 11 included in the address transformation buffer 5. In this flag reset mode, the address validity flags F in the tag memory 11 are partially rewritten without an address select operation.

The present invention relates to a semiconductor memory having a specific bit, e.g., the address validity flag F or the like which may be partially rewritten, such as the address transformation buffer 5 included in the memory management unit 1. Therefore, detailed description of the specific arrangement and operation of the address transformation control circuit 6 is omitted.

Further, the address transformation buffer 5 includes parity generating circuits 7, 8 and parity check units 14, 15 which are provided in correspondence with the tag memory 11 and the frame number memory 12, respectively.

The tag memory 11 in the address transformation buffer 5 includes a memory array comprising q+1 word lines disposed so as to extend parallel with each other in the horizontal direction as viewed in the figure, m+1 pairs of complementary data lines which are disposed so as to extend parallel with each other in the vertical direction, and (q+1)×(m+1) static memory cells MC respectively disposed at the intersections of the word lines and the complementary data lines in the form of a matrix, although not necessarily limitative thereto. It is a matter of course that the word lines in the memory array respectively correspond to the addresses in the tag memory 11 and the complementary data line pairs respectively correspond to the bits of information stored in the tag memory 11. More specifically, the 0 th to m−2 th complementary data line pairs in the tag memory 11 are arranged to correspond to the index portions ID, while the m−1 th bit is arranged to correspond to the address validity flag F. The m th and m−1 th bits in the tag memory 11 are, although not necessarily limitative, arranged to correspond to a parity bit P1 and a dummy bit DF, respectively. The parity bit P1 is formed in accordance with the corresponding index portion ID and address validity flag F when the tag memory 11 is set in the write operation mode. The dummy bit DF is arranged such that the same content as that of the corresponding address validity flag F is written into the dummy bit DF in the write operation mode and, when the address validity flags F are partially rewritten in the flag reset mode, for example, the dummy bit DF of each address is not rewritten but left to hold the previous content of the corresponding address validity flag F.

The word lines that constitute the memory array of the tag memory 11 are coupled to the address decoder 9 and alternatively brought into a select state which is a high-level state.

The address decoder 9 decodes the address signal A0 to Ai supplied from the address transformation control circuit 6 and alternatively brings the one word line in the tag memory 11 which corresponds to the decoded signal into a select state which is a high-level state.

A write amplifier WA is provided at one end of the arrangement of the data line pairs that constitute the memory array of the tag memory 11 such that one end of each complementary data line pair is coupled to an output terminal of the corresponding unit circuit of the write amplifier WA, while a read amplifier RA is provided at the other end of the arrangement of the data line pairs such that the other end of each complementary data line pair is coupled to an input terminal of the corresponding unit circuit of the read amplifier RA.

The respective input terminals of the unit circuits of the write amplifier WA are supplied with the index portion ID and the address validity flag F through the parity generating circuit 7. The index portion ID is supplied to the unit circuits of the write amplifier WA which correspond respectively to the 0 th to m−2 the complementary data line pairs, as described above, while the address validity flag F is supplied to the unit circuits which correspond respectively to the m−1 th and m+1 th complementary data line pairs. The unit circuit of the write amplifier WA which corresponds to the m th complementary data line pair is supplied with a parity bit P1 which is formed in the parity generating circuit 7.

The parity generating circuit 7 is selectively brought into an operative state when the address transformation buffer 5 is set in the write mode. In the operative state, the parity generating circuit 7 forms a parity bit P1 on the basis of an index portion ID and address validity flag F which are supplied thereto from the address transformation control circuit 6. The parity bit P1 is, although not necessarily limitative, formed so that the number of bits which carry the logic "1" among the index portion ID, the address validity flag F and the parity bit P1 is odd.

On the other hand, the index portion ID which is output from the read amplifier RA of the tag memory 11 is delivered to the address transformation control circuit 6 through the parity check unit 14 and also supplied to one input terminal of the tag comparison circuit 13. The address validity flag F is also delivered to the address transformation control circuit 6 through the parity check unit 14. The parity bit P1 and the dummy bit DF are supplied to a parity transfer circuit which is provided in the parity check unit 14. The other input terminal of the tag comparison circuit 13 is supplied with the index portion ID from the address transformation control circuit 6.

The tag comparison circuit 13 is selectively brought into an operative state when the memory management unit 1 is set in the tag comparison mode. In the operative state, the tap comparison circuit 13 makes a bitwise comparison between an index portion ID which is supplied from the address transformation control circuit 6 and an index portion ID which is read out from the tag memory 11. When all the bits of these two tags are coincident with each other (i.e., "hit") as a result of the comparison, the tag comparison circuit 13 selectively supplies a high-level tag coincidence signal tm to the address transformation control circuit 6.

The parity check unit 14 includes a parity transfer circuit 15 which selectively transfers the parity bit P1 in accordance with the address validity flag F and the dummy bit DF and a parity check circuit 16 which receives both an internal parity bit p which is output from the parity transfer circuit 15 and the above-described index portion ID, as described later.

The frame number member 12 in the address transformation buffer 5 includes a memory array comprising Q+1 word lines disposed so as to extend parallel with each other in the horizontal direction as viewed in the figure, n+1 pairs of complementary data lines which are disposed so as to extend parallel with each other in the vertical direction, and $(q+1)\times(n+1)$ static memory cells MC respectively disposed at the intersections of the word lines and the complementary data lines in the form of a matrix, although not necessarily limitative thereto. It is a matter of course that the word lines in the memory array respectively correspond to the addresses in the frame number memory 12 and the complementary data line pairs respectively correspond to the bits of information stored in the frame number memory 12. More specifically, the 0 th to n th complementary data line pairs in the frame number memory 12 are arranged to correspond to frame number FN, while the n+1 th bit is arranged to correspond to a parity bit P2. The parity bit P2 is formed in accordance with the corresponding frame number FN when the frame number memory 12 is set in the write operation mode.

The word lines that constitute the memory array of the frame number memory 12 are coupled to the address decoder 10 and alternatively brought into a select state which is a high-level state.

The address decoder 10 is activated simultaneously with the above-described address decoder 9 to decode the address signal A0 to Ai supplied from the address transformation control circuit 6 and alternatively brings the one word line in the frame number memory 12 which corresponds to the decoded signal into a select state which is a high-level state.

The complementary data line pairs that constitute the memory array of the frame number memory 12 are coupled to the parity generating circuit 8 through the corresponding unit circuits of a write amplifier WA in the same way as the above-described tag memory 11. The frame number memory 12 is supplied with a frame number FN and a parity bit P2 from the parity generating circuit 8. The frame number FN is transferred to the 0 th to n th complementary data line pairs in the frame number memory 12, while the parity bit P2 is transmitted to the n+1 th complementary data line pair, as described above.

The parity generating circuit 8 is selectively brought into an operative state when the address transformation buffer 5 is set in the write mode. In the operative state, the parity generating circuit 8 forms a parity bit P2 on the basis of a frame number FN which is supplied thereto from the address transformation control circuit 6. The parity bit P2 is, although not necessarily limitative, formed so that the number of bits which carry the logic "1" among the frame number FN and the parity bit P2 is odd.

On the other hand, the frame number FN which is output from the frame number memory 12 is delivered to the parity check unit 15 through the corresponding unit circuits of a read amplifier RA and further delivered to the address transformation control circuit 6. The parity bit P2 is also supplied to the parity check unit 15.

The parity check unit 15 conducts a parity check operation on the basis of the frame number FN output through the read amplifier RA of the frame number memory 12 and the above-described parity bit P2. If a parity error is detected as a result of the parity check, the parity transfer circuit 15 delivers a high-level parity error signal pe2 to the address transformation control circuit 6. The address transformation control circuit 6 takes in the frame number FN upon condition that the parity error signal pe2 is at the low level, although not necessarily limitative thereto.

If the parity error signal pe2 is at the high level, the address transformation control circuit 6 does not take in the frame number FN but raises the physical address strobe signal to the high level.

Figure 4:
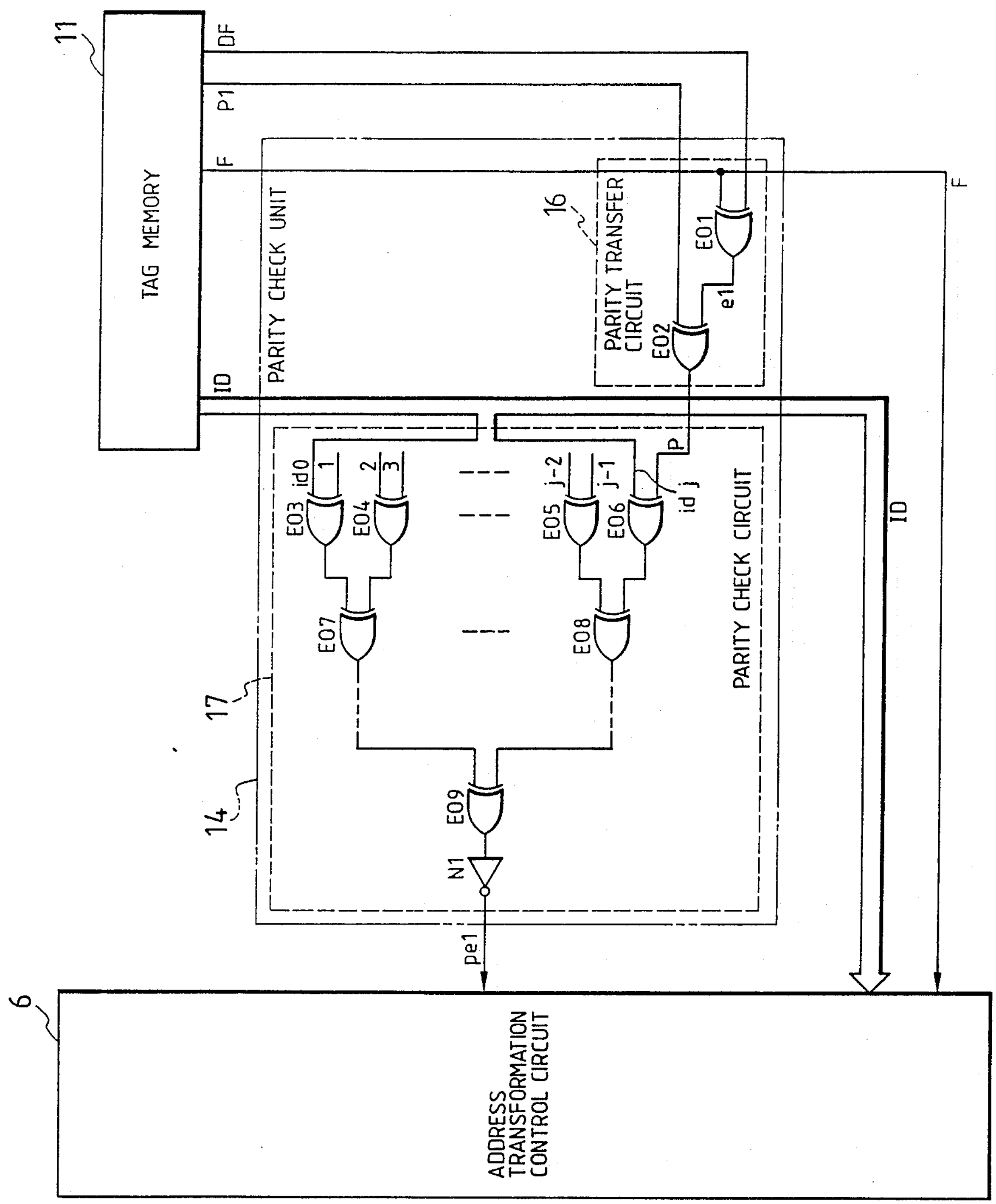
FIG. 4 is a circuit diagram showing one example of the arrangement of each of the parity transfer and parity check circuits which are included in the address transformation buffer shown in FIG. 3.

FIG. 4 is a circuit diagram showing one example of the parity check circuit 14 included in the memory management unit 1 according to this embodiment. The parity transfer circuit 15 is shown as being a part of the parity check unit 14 for the sake of convenience.

The parity transfer circuit 15 selectively forms an internal parity bit p on the basis of the address validity flag F and the dummy bit DF. More specifically, when the dummy bit DF and the address validity flag F are coincident with each other, the parity transfer circuit 15 defines the parity bit P1 as an internal parity bit p and transfers it to the parity check circuit 16. When the dummy bit DF and the address validity flag F are not coincident with each other, the parity transfer circuit 15 judges that the address validity flag F has been rewritten by an operation conducted in the flag reset mode. At this time, the parity transfer circuit 15 inverts the parity bit P1 to form an internal parity bit p and transfers it to the parity check circuit 16.

The parity check circuit 16 conducts a parity check operation on the basis of the index portion ID which is output from the read amplifier RA of the tag memory 11 and the internal parity bit p which is supplied from the parity transfer circuit 15. If a parity error is detected as a result of the parity check, the parity check circuit 16 delivers a highlevel parity error signal pe1 to the address transformation control circuit 6. The address transformation control circuit 6 validates the above-described tag coincidence signal tm upon condition that the parity error signal pe1 is at the low level, although not necessarily limitative thereto.

More specifically, the parity transfer circuit 15 includes EX-OR circuits EO1 and EO2. The EX-OR circuit EO1 is supplied at one input terminal thereof with the address validity flag F from the tag memory 11 and at the other input terminal with the dummy bit DF. The output signal from the EX-OR circuit EO1 is supplied to one input terminal of the EX-OR circuit EO2. The other input terminal of the EX-OR circuit EO2 is supplied with the parity bit P1 from the tag memory 11. The output signal from the EX-OR circuit EO2 is input as being an internal parity bit p to one input terminal of an EX-OR circuit EO6 which constitutes the parity check circuit 16.

Thus, the output signal e1 from the EX-OR circuit EO1 is expressed as follows:

$$e1 = F \oplus DF$$

and, when either the address validity flag F or the dummy bit DF is the logic "1", that is, when the address validity flag F and the dummy bit DF are not coincident with each other, the output signal e1 is selectively raised to a high level which is defined as the logic "1".

The output signal from the EX-OR circuit EO2, that is, the internal parity bit p, is expressed as follows:

$$\begin{aligned} p &= e1 \oplus P1 \\ &= (F \oplus DF) \oplus P1 \\ &= (F \oplus DF) \cdot P1 + (F \oplus DF) \cdot P1 \end{aligned}$$

Accordingly, when the address validity flag F and the dummy bit DF are coincident with each other and hence the output signal e1 from the EX-OR circuit EO1 is the logic "0", the output signal from the EX-OR circuit EO2 is as follows:

$$p = P1$$

and the parity bit P1 is transferred in this state to the parity check circuit 16 as being an internal parity bit p.

On the other hand, when address validity flag F and the dummy bit DF are not coincident with each other and hence the output signal e1 from the EX-OR circuit EO1 is the logic "1", the output signal from the EX-OR circuit EO2 is as follows:

$$p = \overline{P1}$$

Thus, the parity bit P1 is inverted and the inverted parity bit is transferred to the parity check circuit 16 as being an internal parity bit p.

As has been described above, when the memory management unit 1 is set in the write mode, the same content as that of the address validity flag F is written into the corresponding dummy bit DF. The address validity flags F may be partially rewritten without an address select operation in the flag reset mode which is set at the time, for example, of changing over programs from one to another in the central processing unit CPU. Therefore, when the address validity flag F and the dummy bit DF are not coincident with each other, the parity transfer circuit 15 judges that the address validity flag F has been partially rewritten in the flag reset mode, and then the parity transfer circuit 15 inverts the parity bit P1 and transfers the inverted parity bit to the parity check circuit 16.

The parity check circuit 16 includes a plurality of EX-OR circuits EO3 to EO9 which are connected in the form of a tree, together with an inverter circuit N1, although not necessarily limitative thereto. The EX-OR circuit EO3 is supplied at one input terminal thereof with the 0 th bit of the index portion ID supplied from the tag memory 11, that is, the index portion id0, and at the other input terminal thereof with the 1st bit of the index portion ID, that is, the index portion id1. Similarly, each of the EX-OR circuits EO4 to EO5 is supplied with at two input terminals thereof with two bits among the 2nd to j−1 th bits of the index portion ID. The EX-OR circuit EO6 is supplied at one input terminal thereof with the j th bit of the index portion ID, that is, the index portion idj. The other input terminal of the EX-OR circuit EO6 is supplied with the output signal from the parity transfer circuit 15, that is, the internal parity bit p, as described above.

The output signals from the EX-OR circuits EO3 and EO4 are supplied to the input terminals, respectively, of an EX-OR circuit EO7 in the subsequent stage. The output signals from the EX-OR circuits EO5 and EO6 are supplied to the input terminals, respectively, of an EX-OR circuit EO8. Similarly, the output signals from each pair of the initial-stage circuits (not shown) of the parity check circuit 16 are supplied to the input terminals, respectively, of the corresponding one of the EX-OR circuits in the subsequent stage.

Further, the output signals from each pair of the EX-OR circuits in the second stage and those in the following stages are supplied to the input terminals, respectively, of the corresponding one of the EX-OR circuits in a subsequent stage. The input terminals of the EX-OR circuit EO9 are supplied with the output signals from the EX-OR circuits in the stage which immediately precedes it. The output signal from the EX-OR circuit EO9 is inverted by the inverter circuit N1 which constitutes the final stage and the inverted signal is supplied to the address transformation control circuit 6 as being the above-described parity error signal pe1.

Thus, the output signal from the parity check circuit 16, that is, the parity error signal pe1, is expressed as follows:

$$pe1 = id0 \oplus id1 \oplus \ldots \oplus idn \oplus p$$

and, when the number of bits which carry the logic "1" among the index portions id0 to idn and the internal parity bit p is even, that is, when an parity error is generated in the index portion ID and the parity bit P1 which are read out from the tag memory 11, the output signal from the parity check circuit 16 is selectively raised to the high level.

At this time, the address transformation control circuit 6 does not take in the index portion ID and the address validity flag F but raises the physical address strobe signal to the high level.

As has been described above, the memory management unit 1 in this embodiment is provided with the address transformation buffer 5 which has a predetermined number of entries and the address transformation control circuit 6 which manages the address transformation buffer 5 and executes a paging processing when mishit occurs. The address transformation buffer 5 includes the tag memory 11 for storing index portions ID and address validity flags F and the frame number memory 12 for storing frame numbers FN which correspond respectively to the index portions ID stored in the tag memory 11. The address transformation control circuit 6 has a flag reset mode function for simultaneously resetting the address validity flags F in the tag memory 11 in response to the instruction given from the central processing unit CPU. The memories 11 and 12 are provided with parity bits P1 and P2, respectively, for judging whether or not storage data is normal. The tag memory 11 is further provided with the dummy bit DF. When the memory management unit 1 is set in the write mode, the same content as that of the corresponding address validity flag F is written in the dummy bit DF in each address, whereas, when the memory management unit 1 is set in the flag reset mode, the dummy bit DF if not rewritten. The parity check unit 14 which is provided in correspondence with the tag memory 11 includes the parity transfer circuit 15 and the parity check circuit 16. When an address validity flag F and a dummy bit DF which are supplied to the parity transfer circuit 15 are coincident with each other, it transfers the parity bit P1 to the parity check circuit 16 as it is, whereas, when the address validity flag F and the dummy bit DF are not coincident with each other, the parity transfer circuit 15 inverts the parity bit P1 and transfers the inverted parity bit to the parity check circuit 16. Accordingly, the parity check circuit 16 is capable of accurately judging whether or not an index portion ID and an address validity flag F which are read out from the tag memory 11 are normal even when the address validity flags F have been partially rewritten by an operation carried out in the flag rest mode or the like. Therefore, the address transformation control circuit 6 need not correct the parity bit P1 even at the time of partially rewriting the address validity flags F. Thus, the circuit configuration of the address transformation control circuit 6 is simplified and it is therefore possible to lower the cost and improve the throughput thereof.

As shown in the foregoing embodiment, the following advantages are obtained by applying the present invention to an address transformation buffer or the like which is included in a memory management unit of a digital processing system adopting the virtual storage method:

(1) A semiconductor memory such as an address transformation buffer having a specific bit which may be partially rewritten without an address select operation when a reset operation or the like is conducted is provided with a dummy bit which is allowed to hole the same content as that of the specific bit in an operation of writing data in units of address and which is not rewritten in the above-described reset operation or the like. The semiconductor memory is further provided with a parity transfer circuit which is arranged such that, when the dummy bit which is read out in an operation of reading data in units of address is coincident with the specific bit, the parity transfer circuit transfers a parity bit to a parity check circuit as it is, whereas, when the dummy bit and the specific bit are not coincident with each other, the parity transfer circuit inverts the parity bit and transfers the inverted parity bit to the parity check circuit. Thus, it is possible to selectively correct the parity bit according to the dummy bit.

(2) By virtue of the advantage (1), it is possible to judge whether or not the specific bit has been partially rewritten and to thereby execute an accurate parity check.

(3) By virtue of the advantages (1) and (2), it becomes unnecessary to correct the parity bit at the time of partially rewriting the specific bit and it is therefore possible to simplify a memory management unit or the like which includes, for example, an address transformation buffer, and achieve a lowering in the cost thereof.

(4) By virtue of the advantages (1) to (3), it is possible to improve the throughput of a memory management unit or the like which includes, for example, an address transformation buffer, and increase the processing capacity thereof.

Although the invention accomplished by the present inventors has been described specifically by way of one embodiment, it should be noted here that the present invention is not necessarily limitative to the described embodiment and various changes and modifications may, of course, be imparted thereto without departing from the gist of the invention. For example, in the block diagram shown in FIG. 3, the specific bit may be any other than the address validity flag F and a plurality of specific bits may be provided. In such a case, it is necessary to provide a plurality of dummy bits in correspondence with the plurality of specific bits. The address decoders 9 and 10 which are provided in correspondence with the tag memory 11 and the frame number memory 12, respectively, may be formed into a single address decoder which is jointly used by the two memories 11 and 12. Each of the tag and frame number memories 11 and 12 may be provided with a plurality of memory mats in correspondence with the uses of bits by way of example and may also be formed using dynamic memory cells or bipolar transistors. In the circuit shown in FIG. 4, the parity transfer circuit 15 may be formed using a NAND gate circuit or the like. The parity check units 14 and 15 may adopt the even parity system. The memory management unit 1 may be provided with a circuit which informs the parity check unit 14 that the address validity flag F has been rewritten by an operation carried out in the flag reset mode. Provision of such a circuit eliminates the necessity for the parity check unit 14 to make parity correction when the address validity flag F has been undesirably rewritten by alpha particles or other causes. The block arrangement of the memory management unit 1 shown in FIG. 3 and the specific circuit configuration of the parity check unit 14 shown in FIG. 4 may be variously modified when the present invention is carried out.

Although in the foregoing the invention accomplished by the present inventors has been described by way of one example in which the invention is applied to an address transformation buffer included in a memory management unit of a digital processing system adopting the virtual storage method which is the background applicable field of the invention, the present invention is not necessarily limitative thereto. For example, it is possible to apply the present invention to similar address transformation buffers and various kinds of memory which are employed in various other kinds of control system and data processing system. The present invention may be widely applied, at least, to semiconductor memories having specific bits which may be partially rewritten and digital systems which include such semiconductor memories.

The following is a brief description of the advantages obtained by carrying out the invention disclosed in the present application.

Namely, a semiconductor memory such as an address transformation buffer having a specific bit which may be partially rewritten without an address select operation when a reset operation or the like is conducted is provided with a dummy bit which is allowed to hold the same content as that of the specific bit in an operation of writing data in units of address and which is not rewritten in the above-described reset operation or the like. The semiconductor memory is further provided with a parity transfer circuit which is arranged such that, when the dummy bit is coincident with the specific bit, the parity transfer circuit transfers a parity bit as it is, whereas, when the dummy bit and the specific bit are not coincident with each other, the parity transfer circuit inverts the parity bit and transfers the inverted parity bit. Accordingly, it is possible to judge whether or not the specific bit has been partially rewritten and to thereby execute an accurate parity check. Thus, it is possible to simplify a memory management unit or the like which includes, for example, an address transformation buffer, and achieve a lowering in the cost thereof. In addition, it is possible to improve the throughput of such a memory management unit and increase the processing capacity thereof.

What is claimed is:

1. A semiconductor memory comprising:

a memory array including a plurality of word lines, a plurality of complementary data lines and a plurality of memory cells respectively coupled to the corresponding word lines and the corresponding complementary data lines, wherein to each of said word lines are coupled first memory cells for holding a plurality of bits of data, a second memory cell for holding data representing whether or not said data is valid, a third memory cell for holding parity data concerning the first-mentioned data, and a fourth memory cell for holding data used to make a judgement as to whether or not the data held in said second memory cell has changed;

selecting means coupled to said a plurality of word lines, wherein said selecting means selects one word line according to an address signal supplied thereto;

check means supplied with data held in the memory cells which are coupled to one word line selected by said selecting means, wherein said check means judges whether or not the pieces of data respectively held in said second and fourth memory cells, which are supplied thereto, are coincident with each other and outputs the result of the judgement; and output means supplied through said check means the data held in said first memory cells and the data held in said second memory cell, wherein said output means, when receiving a coincidence signal from said check means, outputs the data held in said first memory cells and the data held in said second memory cell.

2. A semiconductor memory according to claim 1, wherein said check means includes a parity transfer circuit and a parity check circuit.

3. A semiconductor memory according to claim 2, wherein said parity transfer circuit comprises a plurality of EX-OR circuits.

4. A semiconductor memory according to claim 2, wherein said parity check circuit comprises a plurality of EX-OR circuits and at least one inverter circuit.

5. A semiconductor memory according to claim 1, wherein each of said memory cells is a static memory cell.

6. A microcomputer which is formed on a single semiconductor substrate and which has a CPU, a cache memory means coupled to the CPU and a memory management unit coupled to the CPU and the cache memory means, said memory management unit comprising:

a memory array including a plurality of word lines, a plurality of complementary data lines and a plurality of memory cells respectively coupled to the corresponding word lines and the corresponding complementary data lines, wherein to each of said word lines are coupled first memory cells for holding a plurality of bits of data, a second memory cell for holding data representing whether or not said data is valid, a third memory cell for holding parity data concerning the first-mentioned data, and a fourth memory cell for holding data used to make a judgement as to whether or not the data held in said second memory cell has changed;

selecting means coupled to said a plurality of word lines, wherein said selecting means selects one word line according to an address signal supplied thereto;

check means supplied with data held in the memory cells which are coupled to one word line selected by said selecting means, wherein said check means judges whether or not the pieces of data respectively held in said second and fourth memory cells, which are supplied thereto, are coincident with each other and outputs the result of the judgement; and output means supplied through said check means the data held in said first memory cells and the data held in said second memory cell, wherein said output means, when receiving a coincidence signal from said check means, outputs the data held in said first memory cells and the data held in said second memory cell.

7. A microcomputer according to claim 6, wherein said check means includes a parity transfer circuit and a parity check circuit.

8. A microcomputer according to claim 7, wherein said parity transfer circuit comprises a plurality of EX-OR circuits.

9. A microcomputer according to claim 7, wherein said parity check circuit comprises a plurality of EX-OR circuits and at least one inverter circuit.

10. A microcomputer according to claim 6, wherein each of said memory cells is a static memory cell.

* * * * *